US012103313B2

(12) United States Patent
Omura

(10) Patent No.: US 12,103,313 B2
(45) Date of Patent: Oct. 1, 2024

(54) INK TANK, LIQUID STORAGE UNIT, AND LIQUID EJECTION APPARATUS

(71) Applicant: CANON KABUSHIKI KAISHA, Tokyo (JP)

(72) Inventor: Atsushi Omura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 17/890,921

(22) Filed: Aug. 18, 2022

(65) Prior Publication Data

US 2023/0074874 A1 Mar. 9, 2023

(30) Foreign Application Priority Data

Sep. 8, 2021 (JP) ................................ 2021-146464

(51) Int. Cl.
*B41J 2/175* (2006.01)

(52) U.S. Cl.
CPC ....... *B41J 2/17513* (2013.01); *B41J 2/17523* (2013.01)

(58) Field of Classification Search
CPC .. B41J 2/17523; B41J 2/17513; B41J 2/1752; B41J 2/17503; B41J 2/17509
See application file for complete search history.

(56) References Cited

U.S. PATENT DOCUMENTS

2002/0113851 A1* 8/2002 Sasaki .................. B41J 2/17523 347/85
2021/0162766 A1 6/2021 Omura et al.

FOREIGN PATENT DOCUMENTS

JP 2019-177550 10/2019

* cited by examiner

*Primary Examiner* — Jason S Uhlenhake
(74) *Attorney, Agent, or Firm* — Venable LLP

(57) ABSTRACT

Bubble clogging at the time of attaching a liquid storage unit to an ink tank is suppressed. The ink tank comprises a joint pin that is inserted into a joint hole comprised by the liquid storage unit, a reservoir portion that internally reserves ink supplied via the joint hole and the joint pin, and a movable portion capable of moving inside the reservoir portion. As a protruding portion comprised by the liquid storage unit is inserted into a concave portion formed in the movable portion while being in contact therewith, the movable portion moves from a first position to a second position higher than the first position.

8 Claims, 8 Drawing Sheets

INK TANK, LIQUID STORAGE UNIT, AND LIQUID EJECTION APPARATUS

BACKGROUND

Field of the Disclosure

The technique of the present disclosure relates to an ink tank, a liquid storage unit, and a liquid ejection apparatus.

Description of the Related Art

Japanese Patent Laid-Open No. 2019-177550 has disclosed a technique capable of filling up an ink supply tank with ink in a short time by devising the shape thereof.

Further, conventionally, as the method of filling up an ink tank with ink, there is a method in which an ink cartridge (in the following, also called "liquid storage unit") is connected to an ink tank and both are opened to the atmosphere. With the method such as this, it is possible to easily fill up the tank with ink by utilizing the water head difference of the ink.

However, with the filling-up method of Japanese Patent Laid-Open No. 2019-177550, in a case where bubbles enter a joint pin comprised by in the ink tank at the time of attaching the liquid storage unit to the ink tank, it may happen sometimes that it is no longer possible to fill up the tank with ink.

In order to suppress bubbles from entering the joint pin (the phenomenon in which bubbles enter the joint pin is called "bubble clogging" in the following), it is considered to increase the thickness of the joint pin. However, in a case where the thickness of the joint pin is increased, there is a possibility that ink leaks from the joint pin at the time of removing the liquid storage unit.

In order to solve the problem such as this, an object of the technique of the present disclosure is to suppress bubble clogging at the time of attaching a liquid storage unit to an ink tank.

SUMMARY

In order to solve the problem such as this, the present disclosure is an ink tank comprising: a joint pin to be inserted into a joint hole comprised by a liquid storage unit; a reservoir portion that internally reserves ink supplied via the joint hole and the joint pin; and a movable portion capable of moving inside the reservoir portion, wherein as a protruding portion comprised by the liquid storage unit is inserted into a concave portion formed in the movable portion while being in contact therewith, the movable portion moves from a first position to a second position higher than the first position.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

In the following, aspects for embodying the technique according to the present disclosure are explained using the drawings. The following embodiments are not intended to limit the invention according to the scope of the claims and all combinations of features explained in the embodiments are not necessarily indispensable to the solution of the invention.

Further, the embodiments that are explained in the following are each an embodiment example to which the technique according to the present disclosure is applied, and therefore, a variety of restrictions preferred in terms of technology are imposed. However, as long as the technical idea of the present disclosure is obeyed, the technique according to the present disclosure is not limited to the embodiments in the present specification or other specific methods. In the following explanation, throughout the drawings, the same symbol is attached to the configuration having the same function and explanation of the duplicated portion is omitted.

Further, in the specification, explanation is given by assuming ink (dye ink, pigment ink and the like) as an example of a liquid ejected by a liquid ejection apparatus 1 that is explained in the following, but the example of the liquid is not limited to ink.

First Embodiment

<<About Coordinates>>

Figure 1:
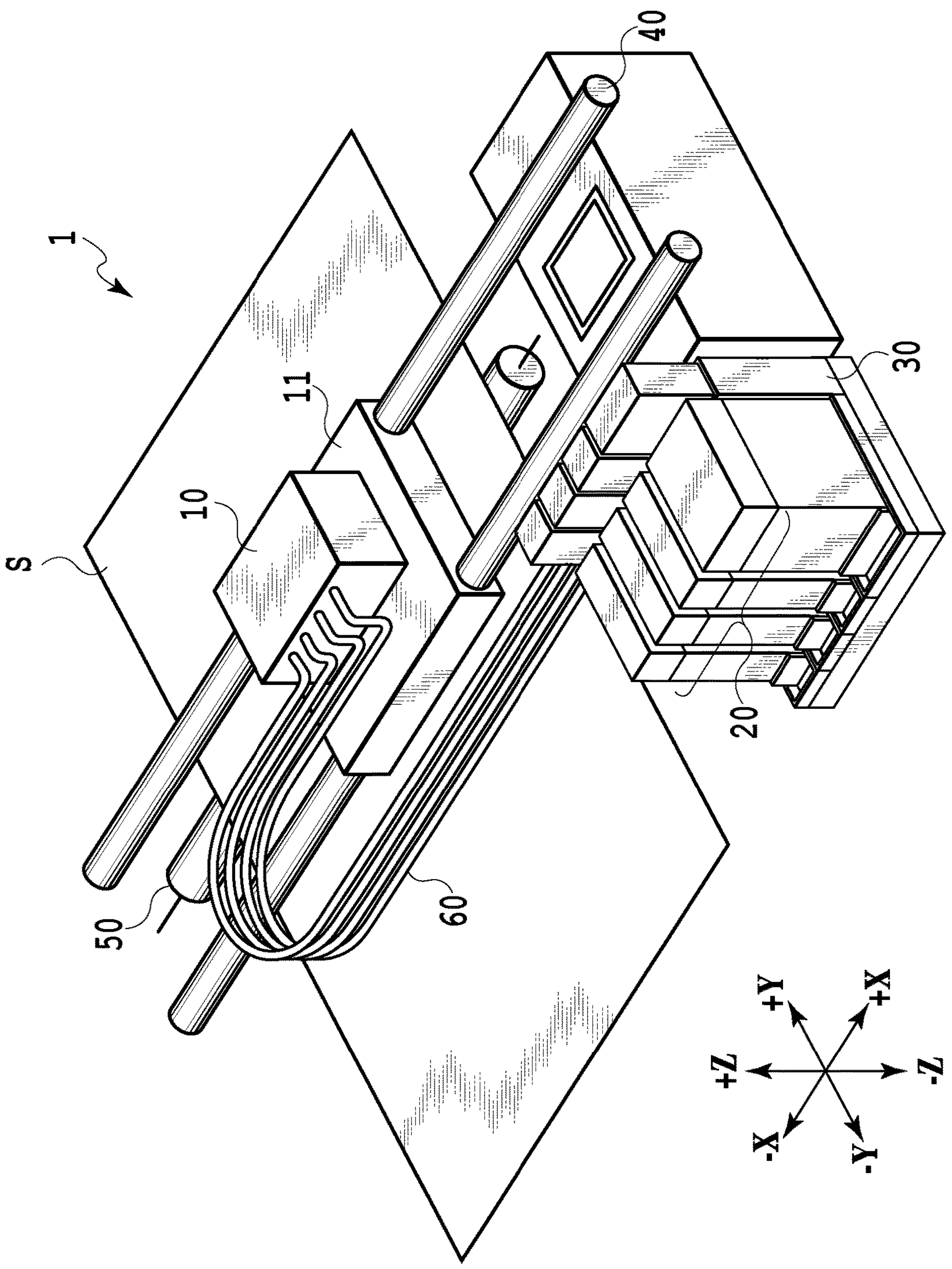
FIG. 1 is a schematic perspective diagram of a liquid ejection apparatus.

First, the coordinates used in each drawing are explained. In the following explanation, as regards the coordinates in the drawings, the width direction (that is, short-side direction) of each liquid storage unit 20 shown in FIG. 1 is called an X-direction. Then, the length direction (that is, long-side direction) of each liquid storage unit 20 is called a Y-direction. Then, the height direction of each liquid storage unit 20 is called a Z-direction. Further, in a case where the liquid storage unit 20 is attached to an ink tank 30, it is necessary to insert a protruding portion 204 (see FIG. 2) comprised by the liquid storage unit 20 into a concave portion (see FIG. 3) comprised by the ink tank 30 and in this case, the insertion direction is called a +Y-direction. On the contrary, in a case where the liquid storage unit 20 is removed from the ink tank 30, it is necessary to pull out the protruding portion 204 of the liquid storage unit 20 from the concave portion 303 comprised by the ink tank 30 and in this case, the pulling direction is called a-Y-direction. Further, with the above-described insertion direction being taken as a reference, the direction toward the right side is called a +X-direction. On the contrary, with the above-described insertion direction being taken as a reference, the direction toward the left side is called a −X-direction. Further, the opposite direction of gravity in the height direction is called a +Z-direction. On the contrary, the direction of gravity in the height direction is called a −Z-direction. The above is the explanation of the coordinates.

<<About Liquid Ejection Apparatus 1>>

The liquid ejection apparatus 1 according to the present embodiment is explained. FIG. 1 is a schematic perspective diagram of the liquid ejection apparatus 1 according to the present embodiment. As shown in FIG. 1, the liquid ejection apparatus 1 comprises an ejection head 10, a carriage 11, the liquid storage unit 20, the ink tank 30 to which the liquid storage unit 20 can be attached, a guide rail 40, a conveyance roller 50, and a tube 60. It is possible to attach and remove the liquid storage unit 20 to and from the ink tank 30.

The liquid ejection apparatus 1 repeats reciprocating movement (main scan) of the ejection head 10 and conveyance (sub scan) for each predetermined pitch on a printing sheet, as a printing medium S. By causing a liquid in one of a plurality of colors to be ejected selectively from the ejection head 10 in synchronization with these movements and causing the liquid to land on the printing medium S, a character, symbol, image or the like is formed. As an example of the liquid ejection apparatus 1, mention is made of, for example, an ink jet printer and the like. The printing medium S is only required to be capable of forming an image by causing ink droplets to land. As an example of the printing medium S, it is possible to use the printing media S of various materials and in various forms, for example, such as paper, cloth, optical disc label surface, plastic sheet, OHP sheet, and envelope.

The ejection head 10 is supported slidably by the two guide rails 40 and mounted on the carriage 11 that reciprocates on a straight line along the guide rail 40 by a driving unit (not shown schematically), such as a motor. Then, on the ejection head 10, a printing element unit (not shown schematically) is mounted. In the printing element unit, as an ejection energy generation element that causes ink to be ejected, a plurality of electrothermal conversion elements (heaters), piezo elements or the like is arrayed. The ejection energy generation element causes the ink supplied through the tube 60 as a liquid supply path to be ejected from the liquid ejection portion. Of course, at this time, there is a case where ink flows through a liquid supply path other than the tube 60. As an example of the configuration that causes ink to be ejected, mention is made of an example in which ink is foamed by, for example, causing the heater to generate heat by using the electrothermal conversion element as the ejection energy generation element and ink is caused to be ejected from the liquid ejection portion by utilizing the foaming energy.

The printing sheet as the printing medium S onto which the ink ejected from the liquid ejection portion of the ejection head 10 lands is conveyed in the direction facing the liquid ejection surface of the ejection head 10 and intersecting with the movement direction of the carriage 11 by the conveyance roller 50, which is a conveyance unit. The ejection head 10 has a plurality of nozzle columns for ejecting ink whose colors are different from one another as a plurality of liquid ejection portions.

Corresponding to the colors of the ink that is ejected from the ejection head 10, a plurality of the independent liquid storage units 20 having a liquid supply member for supplying ink is attached to the ink tank 30. As an aspect of mounting of the ejection head 10 on the carriage 11, a configuration in which the ejection head 10 can be attached and removed easily may be accepted or a configuration in which the ejection head 10 is arranged fixedly may be accepted.

The ink tank 30 and the ejection head 10 are connected by a plurality of the tubes 60 corresponding to the colors of the ink reserved in each ink tank 30. By attaching the liquid storage unit 20 to the ink tank 30, it is possible to supply the liquid of each color stored within the liquid storage unit 20 independently to each nozzle column of the ejection head 10. In a non-printing area within the reciprocating movement range of the ejection head 10 and which is an area outside the range in which the printing sheet passes, a recovery unit is arranged so as to face the liquid ejection surface of the ejection head 10.

The recovery unit has a cap portion for capping the liquid ejection surface of the ejection head 10, a suction mechanism for sucking in ink forcibly in the state where the liquid ejection surface is capped, a cleaning blade for wiping off dust on the liquid ejection surface, and the like. The ink suction that is performed by the above-described suction mechanism is performed by this recovery unit prior to the printing operation of the liquid ejection apparatus 1. Due to this, even in a case where the liquid ejection apparatus 1 is caused to operate after having been left unused for a long time, by the recovery unit performing the recovery processing, it is possible to both or one of the residual air bubble within the liquid ejection portion of the ejection head 10 and the ink in the vicinity of the ejection port, whose viscosity has increased Due to this, the ejection characteristic of the ejection head 10 is maintained. As above, the liquid ejection apparatus 1 has the function to eject ink supplied from the liquid storage unit 20.

<<About Liquid Storage Unit 20>>

Figure 2A:
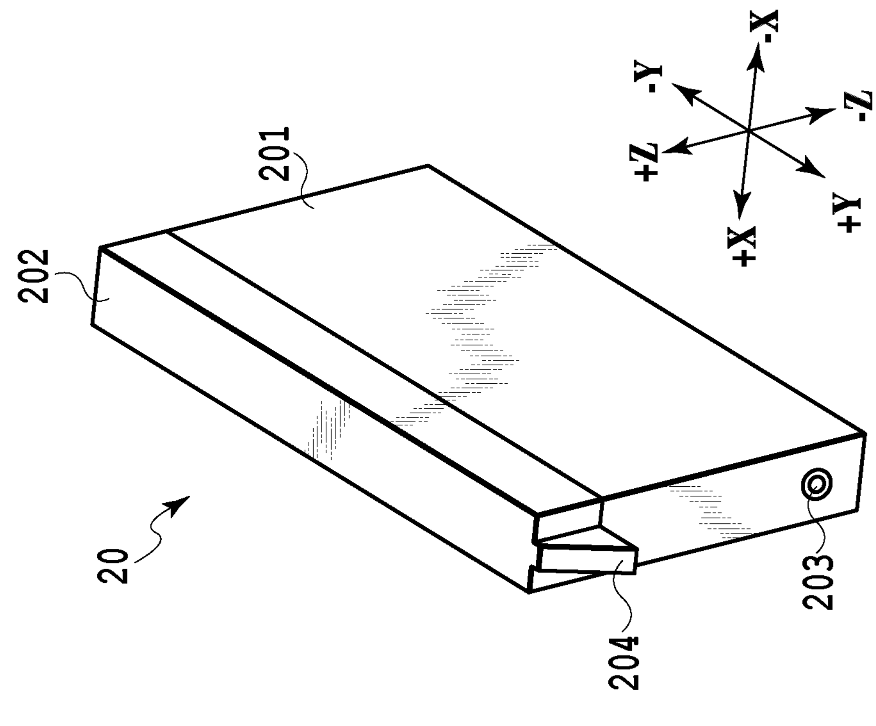
FIG. 2A and FIG. 2B are each a schematic perspective diagram of a liquid storage unit.
Figure 2B:
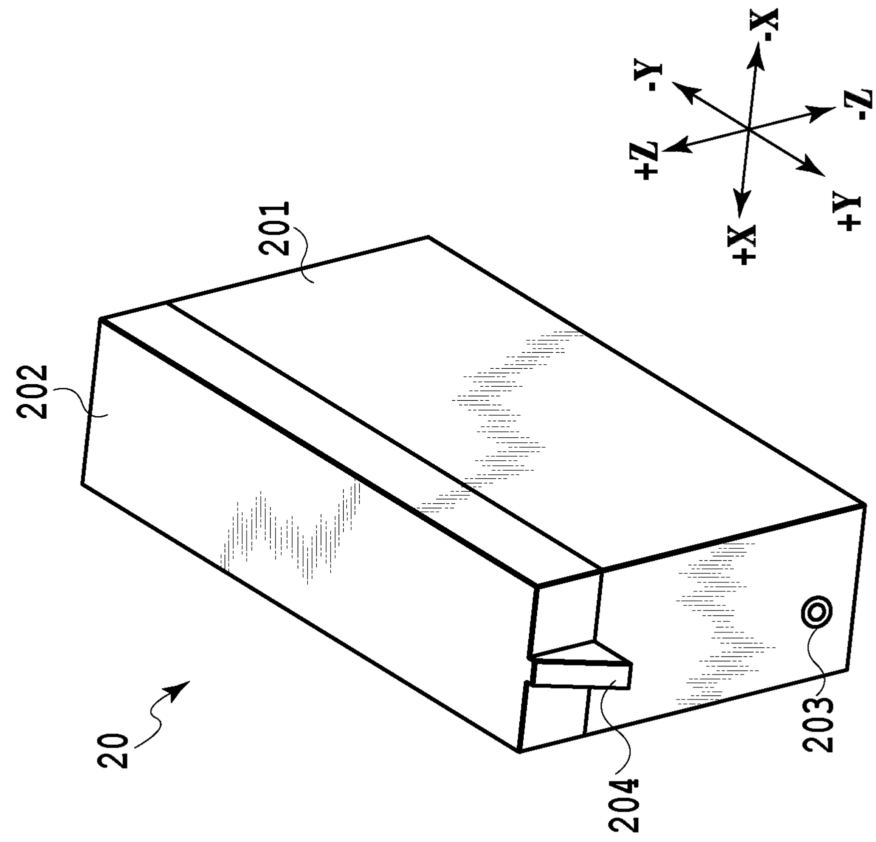

Next, the liquid storage unit 20 according to the present embodiment is explained by using FIG. 2A and FIG. 2B. FIG. 2A and FIG. 2B are each a schematic perspective diagram of the liquid storage unit 20 according to the present embodiment. FIG. 2A is an example of the liquid storage unit 20 that is usable in the above described liquid ejection apparatus 1. FIG. 2B is an example of the liquid storage unit 20 in which a liquid whose use frequency is higher than the liquid stored in the liquid storage unit 20 in FIG. 2A is stored. The liquid storage unit 20 in FIG. 2A and the liquid storage unit 20 in FIG. 2B have the same basic configuration except in that the width (amount of stored liquid) is different. Consequently, in the following, the liquid storage unit 20 in FIG. 2A is explained mainly. In the liquid storage unit 20, the surface located on the side in the X-direction is called a "side surface". Further, the surface located on the side in the +Y-direction is called a "front surface" and the surface located on the side in the −Y-direction is called a "back surface". Furthermore, the surface located in the +Z-direction is called a "top surface" and the surface located on the side in the −Z-direction is called a "bottom surface".

As shown in FIG. 2A, the liquid storage unit 20 comprises a liquid storage portion 201 that stores a liquid and a ceiling portion 202 located on the upper portion of the liquid storage portion 201. Further, the liquid storage unit 20 comprises a joint hole 203 formed on the front surface side of the liquid storage portion 201 and the protruding portion 204 formed on the front surface side of the ceiling portion 202. Inside the liquid storage portion 201, the liquid storage unit 20 stores ink that is supplied to the ink tank 30 comprising a movable unit 302 (see FIG. 3A and FIG. 3B) that moves from a first position to a second position higher than the first position. Details of the configurations comprised by the ink tank 30 will be described later using FIG. 3A and FIG. 3B. Further, on the side in the opposite direction of gravity of the liquid storage portion 201 (that is, on the side in the +Z-direction), the ceiling portion 202 is comprised. It may also be possible to provide the ceiling portion 202 separately from the liquid storage portion 201 and join the ceiling portion 202 to the liquid storage portion 201. Alternatively, it may also be possible to form the liquid storage portion 201 and the ceiling portion 202 by integral molding so that there is no boundary between the liquid storage portion 201 and the ceiling portion 202.

Further, on the surface of the liquid storage portion 201 (that is, on the front surface side of the liquid storage unit 20), which faces a joint pin 308 comprised by the ink tank 30, the joint hole 203 is formed. The joint hole 203 comprises an ink leakage suppression unit (not shown schematically) and is configured to prevent ink stored within the liquid storage portion 201 from leaking. As an example of the ink leakage suppression unit, mention is made of a rubber film with a cut. For example, in a case where the joint pin 308 comprised by the ink tank 30, to be described later, is inserted into the above-described cut, the joint pin 308 pushes away the rubber film and makes an opening and in a case where the joint pin 308 is pulled out, the opening is closed by the elastic force of the rubber. Due to this, it is possible to suppress the ink within the liquid storage portion 201 from leaking. Further, as another example of the ink leakage suppression unit, mention is made of an example in which a biasing unit (spring and the like) is used. According to this example, it is possible to open the joint hole 203 by pressing the spring in a case where the joint pin 308 is inserted and close the joint hole 203 in a case where the joint pin 308 is not inserted by using the force of the spring. By the method such as this, it is also possible to suppress the ink within the liquid storage portion 201 from leaking.

Further, on the surface of the liquid storage unit 20, which faces the ink tank 30, the protruding portion 204 protruding toward the concave portion 303 formed in the movable portion 302 comprised by the ink tank 30 is comprised. That is, the protruding portion 204 protrudes and extends in the insertion direction at the time of attaching the liquid storage unit 20 to the ink tank 30. Further, the protruding portion 204 according to the present embodiment comprises an inclined plane that slopes from the top surface of the liquid storage unit 20 (that is, the top surface of the ceiling portion 202) toward the concave portion 303. That is, the inclined plane formed on the protruding portion 204 according to the present embodiment extends in the insertion direction and in the direction of gravity (that is, in the downward direction). In the movable portion 302 comprised by the ink tank 30, on the surface facing the protruding portion 204 comprised by the liquid storage unit 20 (that is, the surface on the side in the −Y-direction), the concave portion 303 is formed. The surface of the concave portion 303, which comes into contact with the protruding portion 204, is formed so that the depth increases in the opposite direction from the first position to the second position (in the example according to the present embodiment, in the direction of gravity). Further, the surface of the concave portion 303 according to the present embodiment, which comes into contact with the protruding portion 204, is formed so as to be parallel to the inclined plane of the protruding portion 204.

Due to this, at the time of attaching the liquid storage unit 20 to the ink tank 30, by inserting the protruding portion 204 into the concave portion 303 while keeping the inclined plane in contact with the surface formed in parallel to the protruding portion 204 in the concave portion 303, it is possible to push up the movable portion 302. Then, it is preferable for the length of the protruding portion 204 (length in the Y-direction) to be shorter than the length of the joint pin 308 comprised by the ink tank 30 (length in the Y-direction). The reason for this will be described later by using FIG. 4A to FIG. 4E.

<<About Ink Tank 30>>

Figure 3B:
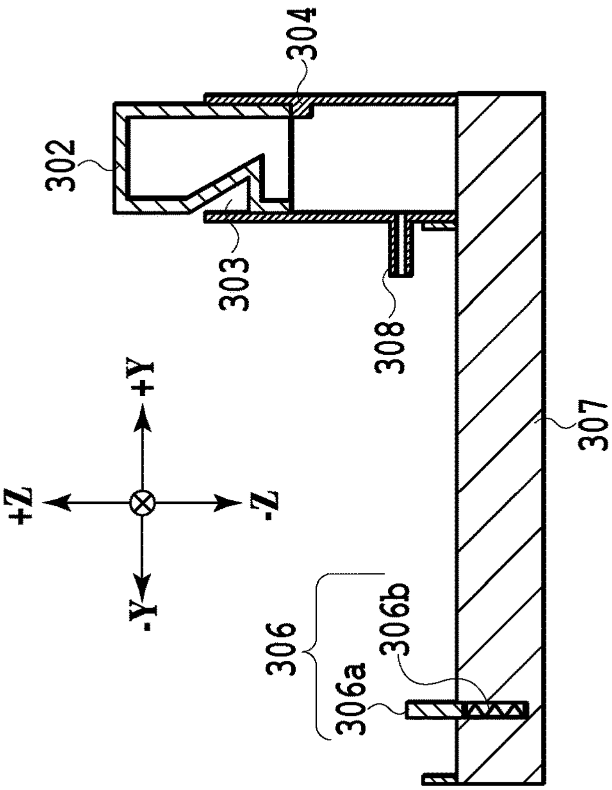
FIG. 3A and FIG. 3B are each a schematic diagram of an ink tank.
Figure 3A:
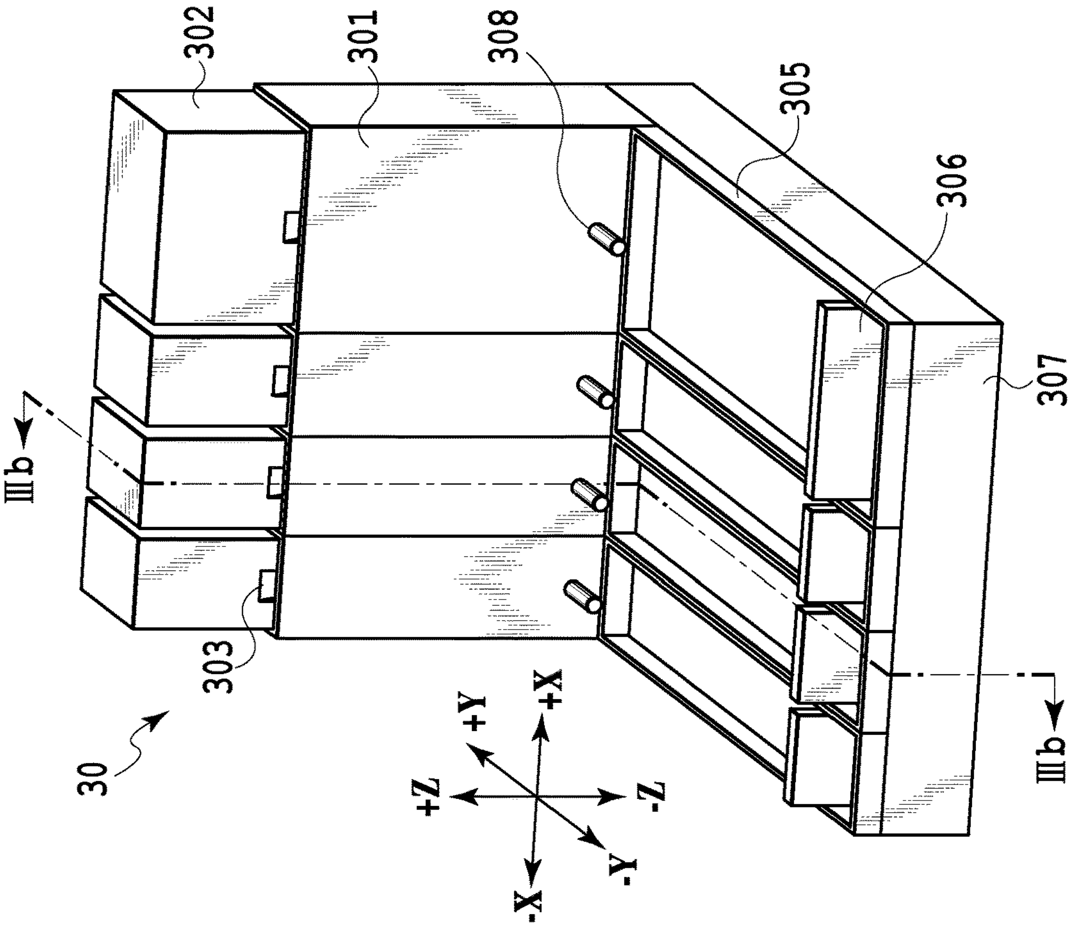

Following the above, the ink tank 30 according to the present embodiment is explained. FIG. 3A and FIG. 3B are each a schematic diagram of the ink tank 30 according to the present embodiment. FIG. 3A shows a schematic perspective diagram of the ink tank 30 according to the present embodiment. FIG. 3B shows a schematic cross-sectional diagram along an III b to III b line in FIG. 3A.

As shown in FIG. 3A and FIG. 3B, the ink tank 30 comprises a reservoir portion 301, the movable portion 302, the concave portion 303, a restriction portion 304, a retainer portion 305, a fixing portion 306, a foundation portion 307, and the hollow joint pin 308. The reservoir portion 301 internally reserves ink supplied from the liquid storage unit 20 via the joint pin 308. The ink temporarily reserved inside the reservoir portion 301 is then supplied to the ejection head 10 described above. Further, the movable portion 302 is arranged inside the reservoir portion 301 and capable of moving in the opposite direction of gravity and in the direction of gravity (that is, in the Z-direction) inside the reservoir portion 301. The reservoir portion 301 and the movable portion 302 are formed into the shape of a syringe. Due to this, in a case where the movable portion 302 moves in the opposite direction of gravity (that is, in the +Z-direction), the capacity of the ink tank 30 increases. That is, in a case where the movable portion 302 moves in the opposite direction of gravity (that is, in the +Z-direction), the pressure inside the ink tank 30 becomes negative compared to that in the state before the movable portion 302 moves.

On the contrary, in a case where the movable portion 302 moves in the direction of gravity (that is, in the −Z-direction), the capacity of the ink tank 30 decreases. That is, in a case where the movable portion 302 returns to the first position (initial position), to be described later, the pressure inside the ink tank 30 returns to the original pressure. Then, in the movable portion 302, on the surface facing the protruding portion 204 comprised by the liquid storage unit 20 (that is, the surface on the side in the −Y-direction), the concave portion 303 is formed. Further, the surface of the concave portion 303, which comes into contact with the protruding portion 204, is formed so that the depth increases in the direction of gravity (that is, in the −Z-direction). Because of this, as the protruding portion 204 comprised by the liquid storage unit 20 is inserted into the concave portion 303 formed in the movable portion 302 while being in contact with the concave portion 303, the movable portion 302 moves from the first position to the second position higher than the first position. That is, as the protruding portion 204 is inserted into the concave portion 303, the movable portion 302 moves from the initial position (see FIG. 4A) to a position (see FIG. 4D and FIG. 4E) higher than the initial position. The length in the longitudinal direction (that is, length in the Z-direction) of the concave portion 303 is formed so that part of the concave portion 303 is exposed at the initial position described above.

Further, as shown in FIG. 3B, inside the circumferential wall of the reservoir portion 301, the restriction portion 304 is formed for restricting the movable portion 302 from moving in the direction opposite to the direction from the first position toward the second position (that is, restricting the movable portion 302 from moving in the direction of gravity). Specifically, in a case where the movable portion

302 moves in the direction of gravity, the bottom surface of the movable portion 302 hits the top surface of the restriction portion 304 and the movable portion 302 is prevented from moving in the direction of gravity more.

Due to this, at the time of exchanging the liquid storage unit 20 with another, even in a case where the movable portion 302 moves in the direction of gravity and the capacity of the ink tank 30 becomes the smallest, it is possible for the restriction portion 304 to stop the movable portion 302 in the state where part of the concave portion 303 is exposed. Consequently, in a case where the next liquid storage unit 20 is attached to the ink tank 30 as well, part of the concave portion 303 is exposed, and therefore, it is possible to insert the protruding portion 204 comprised by the liquid storage unit 20 into the concave portion 303. The restriction portion 304 may be molded integrally with the reservoir portion 301 or may be formed by creating a frame portion of the reservoir portion 301 and then joining the frame portion to the inner surface of the reservoir portion 301. As the method of joining the restriction portion 304 and the reservoir portion 301, it is possible to use a method of causing both to adhere with each other by using an adhesive material, a method of thermally welding both, or the like.

Further, the retainer portion 305 sandwiches and retains both side surfaces of the liquid storage portion 201 at the time of attaching the liquid storage unit 20 by sliding the liquid storage unit 20 toward the side of the ink tank 30. That is, both side surfaces of the liquid storage portion 201 being retained by the retainer portion 305, it is possible to slide the liquid storage unit 20 toward the side of the ink tank 30 in the standing state. Then, after attaching the liquid storage unit 20 to the ink tank 30, it is possible to fix the liquid storage unit 20 from both side surfaces. Further, in a case where the liquid storage unit 20 is slid toward the side of the ink tank 30, the joint pin 308 comprised by the ink tank 30 is inserted into the joint hole 203 comprised by the liquid storage unit 20. Further, as described above, it is preferable for the length of the joint pin 308 (length in the Y-direction) to be greater than the length of the protruding portion 204 (length in the Y-direction). The reason is that it is possible to suppress bubble clogging more in a case where the joint pin 308 is inserted into the joint hole 203 before the protruding portion 204 is inserted into the concave portion 303 formed in the movable portion 302. In the following, the reason is explained in detail. In a case where the protruding portion 204 is inserted into the concave portion 303 before the joint pin 308 is inserted into the joint hole 203, the ink within the liquid storage portion 201 is supplied into the ink tank 30 whose pressure is negative because the movable portion 302 has already been pushed up. In this situation, even in a case where the pressure within the ink tank 30 is made negative and the suction force to suck in the ink from the liquid storage unit 20 is caused to occur, the effect is faint.

In contrast to this, in a case where the joint pin 308 is inserted into the joint hole 203 first, it is possible to cause the suction force to occur by pushing up the movable portion 302 after filling up the hollow joint pin 308 with ink. That is, after the joint pin 308 is filled up with ink, the protruding portion 204 is inserted into the concave portion 303 and the suction force occurs by the movable portion 302 being pushed up, and therefore, it is unlikely that air enters the joint pin 308 and bubble clogging is unlikely to occur within the joint pin 308. That is, in a case where the length of the joint pin 308 is greater than the length of the protruding portion 204, it is possible to suppress bubble clogging more. In a case where the joint pin 308 is inserted into the joint hole 203 and a pump mechanism (not shown schematically) comprised by the liquid ejection apparatus 1 operates, the ink stored inside the liquid storage portion 201 is supplied into the reservoir portion 301 via the joint pin 308.

Further, at the time of attaching the liquid storage unit 20 to the ink tank 30, the foundation portion 307 functions as a foundation on which the liquid storage unit 20 is mounted. Then, the foundation portion 307 according to the present embodiment comprises the fixing portion 306 that restricts the movement of the liquid storage unit 20 and fixes the liquid storage unit 20 after the joint pin 308 comprised by the ink tank 30 is inserted into the joint hole 203 comprised by the liquid storage unit 20. That is, the fixing portion 306 has a function to suppress the retreat (that is, movement in the −Y-direction) of the liquid storage unit 20 attached to the ink tank 30 and fix the liquid storage unit 20. In the present embodiment, the fixing portion 306 comprises a board member **306*a* and a biasing unit 306*b* configured to bias the board member 306*a* in the opposite direction of gravity. At the time of mounting the liquid storage unit 20 on the foundation portion 307, by mounting the liquid storage unit 20 on the foundation portion 307 from above the board member 306*a* (that is, in the +Z-direction), the biasing unit 306 accommodated in the groove of the foundation portion 307 shrinks, and therefore, it is possible to push the board member 306*a* into the groove. In a case where the liquid storage unit 20 is slid on the foundation portion 307 toward the side of the ink tank 30, the board member 306*a* is biased by the biasing unit 306*b* and moves in the opposite direction of gravity (that is, protrudes from the above-described groove) and fixes the liquid storage unit 20** from behind.

Due to this, at the time of attaching the liquid storage unit 20 to the ink tank 30, it is possible to fix the liquid storage unit 20 from both side surfaces and from behind. Consequently, it is possible to reduce the possibility that the movable portion 302 falls unintentionally due to its own weight. That is, the retreat of the liquid storage unit 20 is suppressed by the fixing portion 306, and therefore, it is also possible to reduce the possibility that the ink within the ink tank 30 flows backward toward the liquid storage unit 20 and the possibility that the liquid storage unit 20 is pushed out at unintended timing and dislocated.

<<About Pushing-Up of Movable Portion 302>>

Following the above, the pushing-up of the movable portion 302 according to the present embodiment is explained. FIG. 4A to FIG. 4E are each a schematic diagram showing a series of operations in which the movable portion 302 according to the present embodiment is pushed up. In the following, the operations in which the movable portion 302 comprised by the ink tank 30 is pushed up at the time of the liquid storage unit 20 being attached to the ink tank 30 are explained for each step with reference to FIG. 4A to FIG. 4E.

Figure 4E:
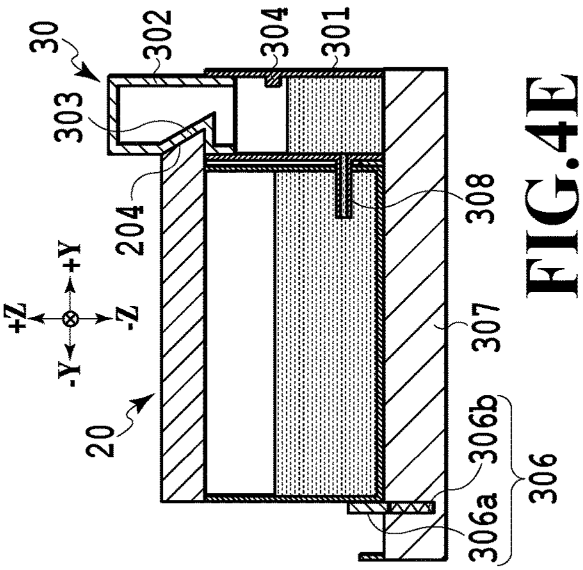
FIG. 4A to FIG. 4E are each a schematic diagram showing a flow of a series of processes of attaching the liquid storage unit to the ink tank.
Figure 4B:
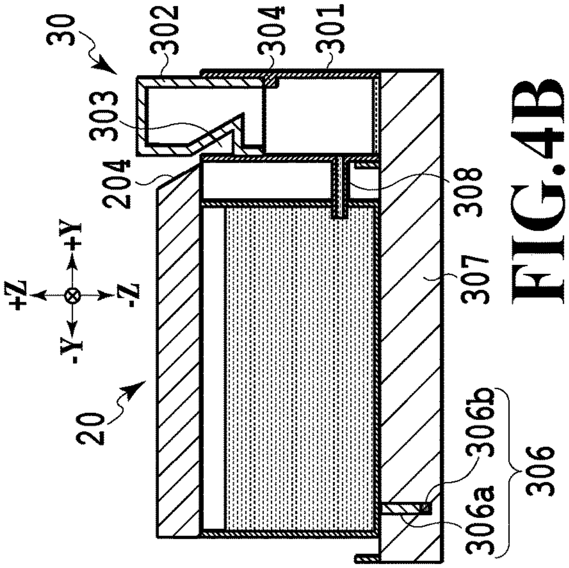
Figure 4D:
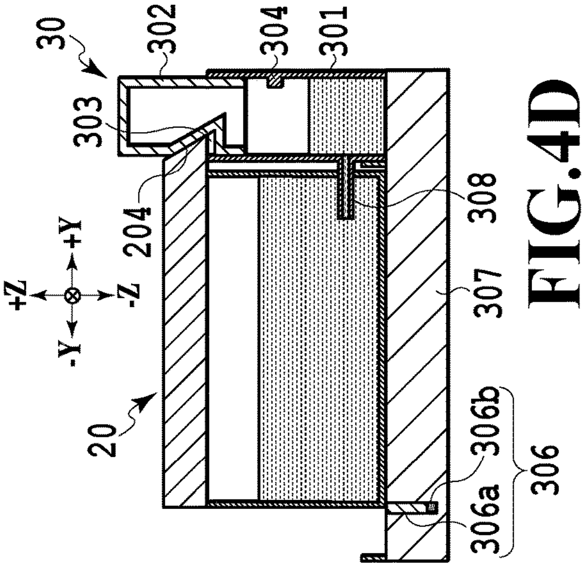
Figure 4A:
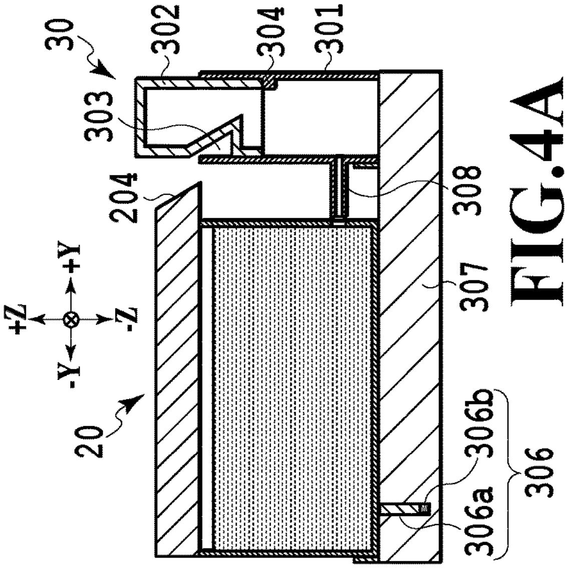

At step 1, as shown in FIG. 4A, by using the bottom surface portion of the liquid storage unit 20, the board member **306*a* comprised by the fixing portion 306 is pushed down. Due to this, the biasing unit 306*b* comprised by the fixing portion 306 shrinks and the board member 306*a* is pushed into the groove formed on the foundation portion 307**.

At step 2, as shown in FIG. 4B, in a case where the liquid storage unit 20 is slid toward the side of the ink tank 30, the joint pin 308 is inserted into the joint hole 203.

Figure 4C:
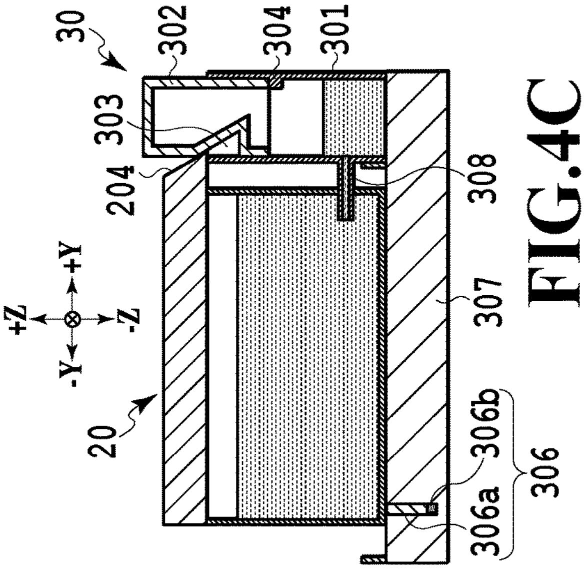

At step 3, as shown in FIG. 4C, in a case where the joint pin 308 is further inserted into the joint hole 203, the inside of the joint pin 308 is filled up with ink. Then, in a case where the liquid storage unit 20 is further slid toward the side of the ink tank 30, the tip of the protruding portion 204 comes into contact with the top end portion of the opening in the concave portion 303.

At step 4, as shown in FIG. 4D, in a case where the protruding portion 204 is pushed into the concave portion 303, the movable portion 302 is pushed up and the movable portion 302 moves from the first position (initial position) to the second position (higher than the initial position). Due to this, the capacity of the ink tank 30 increases and the suction force occurs in the direction in which the ink is pulled from the liquid storage unit 20 into the ink tank 30, and therefore, it is possible to suppress bubble clogging.

At step 5, as shown in FIG. 4E, in a case where the protruding portion 204 is inserted into the concave portion 303 completely, the biasing unit 306*b* having shrunk at step 1 stretches and pushes up the board member 306*a*, the position of the board member 306*a* returns to the original position, and the liquid storage unit 20 is fixed. Due to this, even in a case where the movable portion 302 is heavy, it is possible to suppress the liquid storage unit 20 from being pushed back and retreating in a case where the inclined plane portion of the concave portion 303 pushes down the inclined plane portion of the protruding portion 204 by the weight of the movable portion 302.

<<Conclusion>>

As explained above, with the ink tank 30 according to the present embodiment, it is possible to increase the capacity by pushing up the movable portion 302 by utilizing the force by which the protruding portion 204 is inserted into the concave portion 303 at the time of attaching the liquid storage unit 20. Due to this, the pressure within the ink tank 30 becomes negative, and therefore, the suction force occurs, which sucks in the ink that is stored within the liquid storage unit 20 and with which the inside of the reservoir portion 301 is filled up via the joint pin 308. Consequently, even in a case where bubbles occur at the time of insertion of the joint pin 308, the bubbles are sucked in along with the ink. Because of this, it is possible to suppress bubbles from remaining within the joint pin 308, and therefore, it is possible to suppress bubble clogging. Consequently, with the ink tank 30 according to the present embodiment, it is possible to suppress bubble clogging at the time of attaching the liquid storage unit 20 to the ink tank 30.

Second Embodiment

An object of the present embodiment is to make fixed the water head difference between the liquid within the liquid storage unit 20 and the liquid within the ink tank 30. In the first embodiment, the liquid storage unit 20 and the ink tank 30 do not communicate with the atmosphere, but in the present embodiment, both the liquid storage unit 20 and the reservoir portion 301 communicate with the atmosphere and this is different from the first embodiment. In the following, with reference to FIG. 5A to FIG. 5D, the present embodiment is explained. In the following explanation, the same symbol is attached to the same configuration as that of the first embodiment and at the same time, explanation thereof is omitted and different points are explained mainly.

Figure 5A:
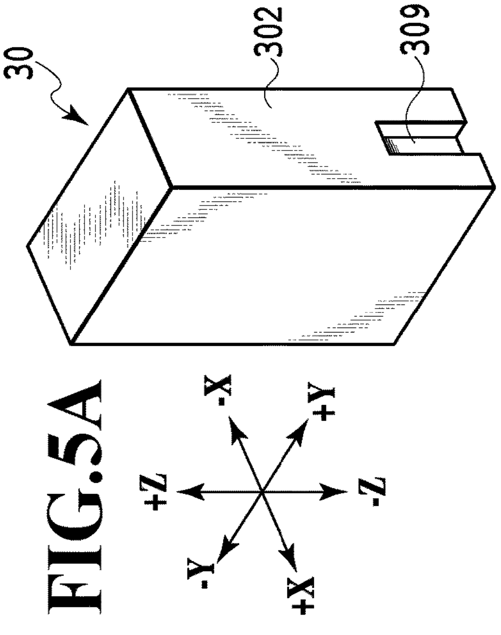
FIG. 5A to FIG. 5D are schematic diagrams showing the liquid storage unit and the ink tank.
Figure 5B:
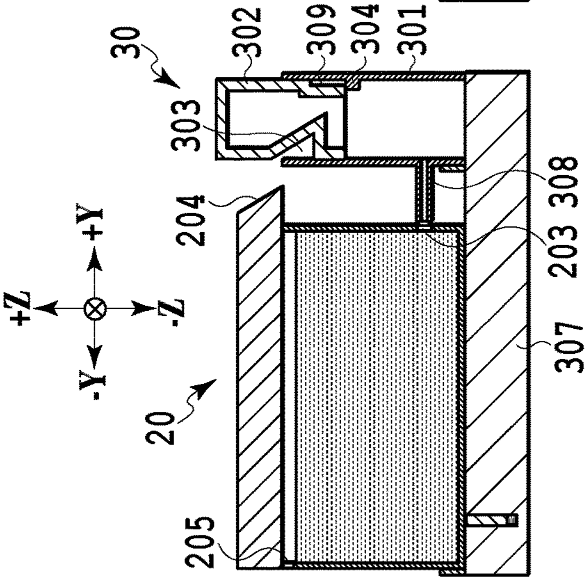

FIG. 5A to FIG. 5D are schematic diagrams showing the liquid storage unit 20 and the ink tank 30 according to the present embodiment. As shown in FIG. 5A, in the movable portion 302 of the ink tank 30 according to the present embodiment, on the lower side (that is, the side in the −Z-direction) on the surface located on the endmost side in the +Y-direction (in the following, called "back surface of the ink tank 30"), a slit 309 as an atmosphere communication opening is formed. That is, in the movable portion 302, the slit 309 is formed that communicates with the atmosphere in a case where the movable portion 302 is located at the highest position in the range in which the movable portion 302 can move and does not communicate with the atmosphere in a case where the movable portion 302 is not located at the highest position in the range in which the movable portion 302 can move. FIG. 5B is a diagram corresponding to step 1 of the first embodiment.

As shown in FIG. 5B, in the ink tank 30, the above-described slit 309 is formed. At the upper portion (that is, on the side in the +Z-direction) on the back surface side of the liquid storage unit 20 according to the present embodiment, an opening 205 as an atmosphere communication opening is formed. It may also be possible to provide the opening 205 with an ink leakage suppression unit configured to suppress ink leakage within the liquid storage unit 20. As an example of the ink leakage suppression unit, mention is made of a gas-liquid exchange membrane that causes air to pass but does not cause ink to pass, and the like. As another example, mention is made of an example in which the opening 205 is sealed by using a tape at the time of attaching the liquid storage unit 20 to the ink tank 30 and the tape is peeled off to cause the opening 205 to communicate with the atmosphere in a case where the liquid ejection apparatus 1 is used.

Figure 5C:
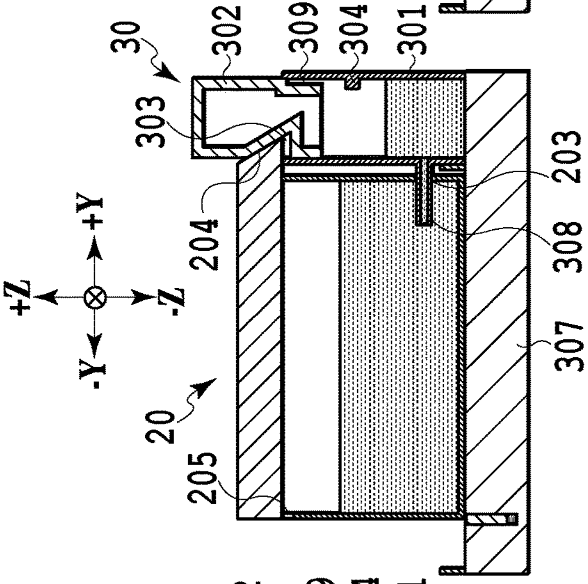

FIG. 5C is a diagram corresponding to step 4 of the first embodiment. In the present embodiment also, as the protruding portion 204 is inserted into the concave portion 303, the movable portion 302 is pushed up. At this step, the movable portion 302 is pushed up as in the first embodiment, but the movable portion 302 is not located at the highest position yet. Because of this, the opening of the slit 309 remains blocked by the circumferential wall of the reservoir portion 301.

Figure 5D:
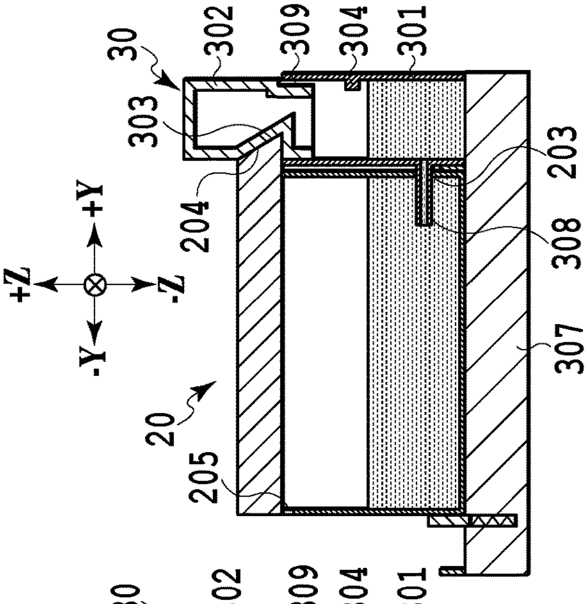

FIG. 5D is a diagram corresponding to step 5 of the first embodiment. As shown in FIG. 5D, the length of the slit 309 is formed so that part of the top portion of the slit 309 is exposed from the back surface portion of the reservoir portion 301 in a case where the protruding portion 204 of the liquid storage unit 20 is inserted into the concave portion 303 of the ink tank 30 completely.

With the configuration of the liquid storage unit 20 and the ink tank 30 according to the present embodiment, at the time in point of steps 1 to 4, the liquid storage unit 20 and the ink tank 30 do not communicate with the atmosphere, but at the point in time of step 5, they communicate with the atmosphere. In the present embodiment, at step 5, the state is brought about where both the inside of the liquid storage unit 20 and the inside of the ink tank 30 communicate with the atmosphere. Because of this, the ink moves so that there is no water head difference between the ink stored in the liquid storage unit 20 and the ink stored in the reservoir portion 301 of the ink tank 30. That is, there is no water head difference between the ink within the liquid storage unit 20 and the ink within the ink tank 30.

With the liquid storage unit 20 and the ink tank 30 according to the present embodiment, it is possible to sufficiently fill up the inside of the ink tank 30 with liquid irrespective of the movable range of the movable portion 302 of the ink tank 30 without losing the suppression effect of bubble clogging.

Third Embodiment

An object of the present embodiment is to make it possible for a user to correctly attach the liquid storage unit 20 to the ink tank 30. In the first embodiment, the individual shape of the concave portion 303 of each ink tank 30 is not referred to particularly. In a case where the shape of the concave portion 303 comprised by each ink tank 30 is made uniform, there is a possibility that a problem occurs.

Consequently, in each movable portion 302 comprised by each ink tank 30 according to the present embodiment, the concave portion 303 corresponding to the protruding portion 204 comprised by the liquid storage unit 20 that is attached is formed. In the following, with reference to FIG. 6A and FIG. 6B, the present embodiment is explained. In the following explanation, the same symbol is attached to the same configuration as that of the first embodiment and at the same time, explanation thereof is omitted and different points are explained mainly.

Figure 6A:
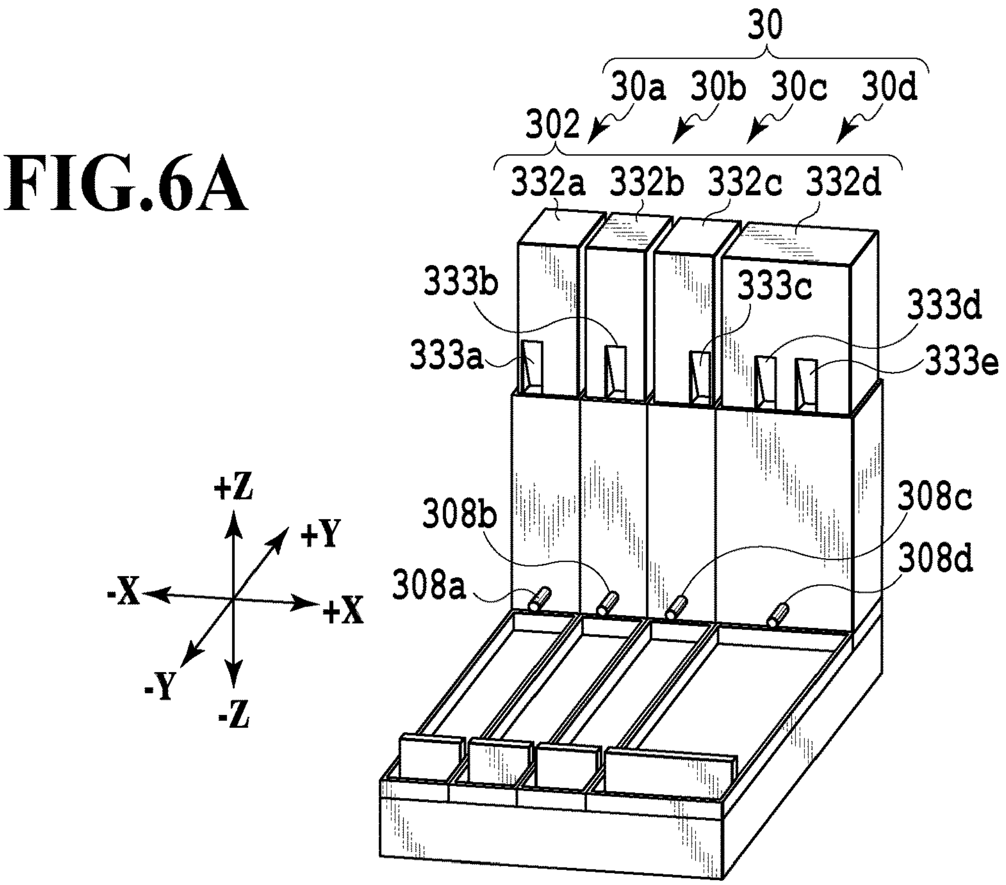
FIG. 6A and FIG. 6B are schematic diagrams showing the liquid storage unit and the ink tank.
Figure 6B:
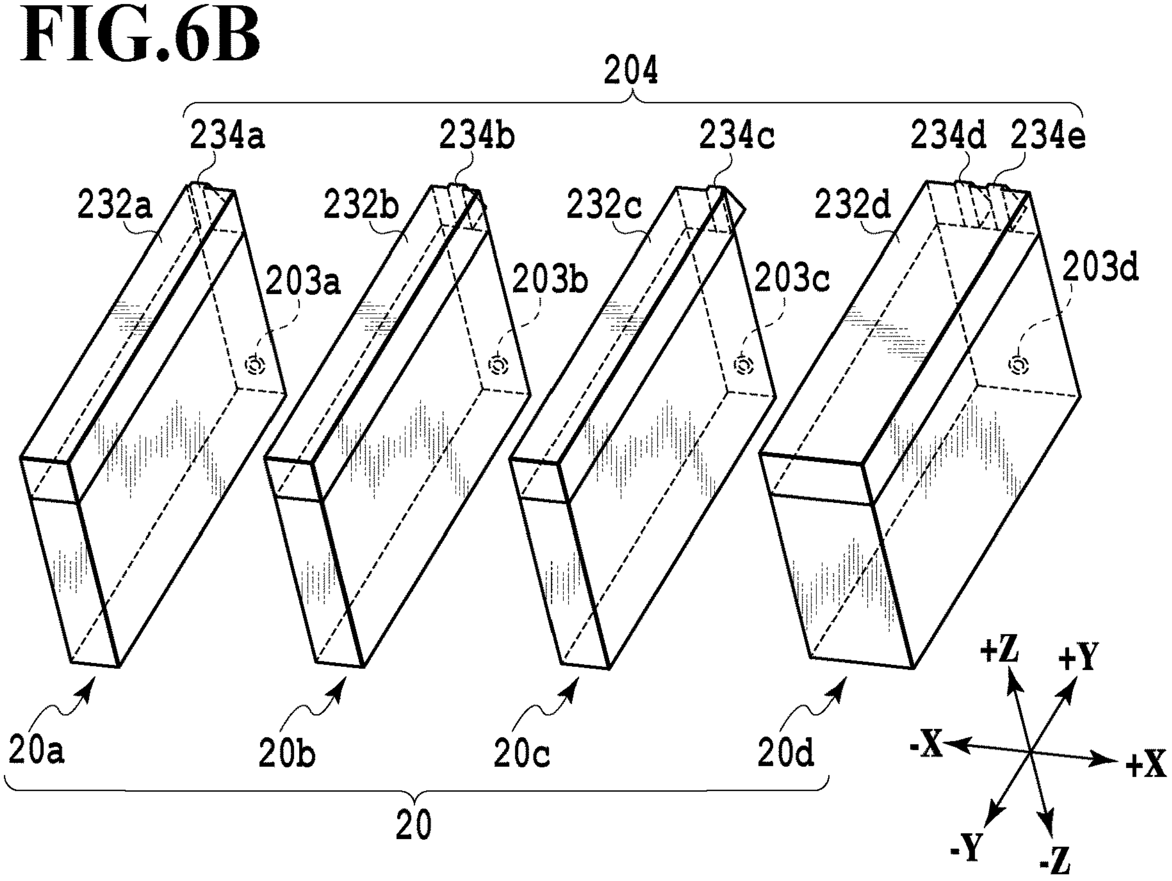

FIG. 6A and FIG. 6B are schematic diagrams showing the liquid storage unit 20 and the ink tank 30 according to the present embodiment. As shown in FIG. 6A, four of the ink tanks 30 are provided as in the first embodiment. In the present embodiment, each ink tank 30 is called a first ink tank 30*a*, a second ink tank 30*b*, a third ink tank 30*c*, and a fourth ink tank 30*d* in order from the left in FIG. 6A. In FIG. 6A, for convenience of explanation, the state where the movable portion 302 is pushed up is shown without schematically showing the liquid storage unit 20, but the position does not indicate the first position (initial position) of the movable portion 302.

The first ink tank 30*a* according to the present embodiment comprises a first joint pin 308*a* that is inserted into a first joint hole 203*a*, to be described later, and a first movable portion 332*a*. Further, in the first movable portion 332*a*, a first concave portion 333*a* into which a first protruding portion 234*a*, to be described later, is inserted is formed. The first concave portion 333*a* is formed on the left side in FIG. 6A at the lower portion (that is, on the side in the −Z-direction and on the side in the −X-direction) on the surface located on the endmost side in the −Y-direction (in the following, called "front surface of the ink tank 30"). As in the first embodiment, the first concave portion 333*a* also has a rectangular opening and has a contact surface that extends in the depth direction from the top end of the opening toward the bottom end and which comes into contact with the inclined plane of the first protruding portion 234*a* comprised by a first liquid storage unit 20*a* according to the present embodiment. In the present embodiment, the number of first concave portions 333*a* that are formed is one.

The second ink tank 30*b* according to the present embodiment comprises a second joint pin 308*b* that is inserted into a second joint hole 203*b*, to be described later, and a second movable portion 332*b*. Further, in the second movable portion 332*b*, a second concave portion 333*b* into which a second protruding portion 234*b*, to be described later, is inserted is formed. The second concave portion 333*b* is formed at the lower portion on the front surface side of the second ink tank 30*b* and at the center in a case where the width direction (X-direction) is taken as a reference. As in the first embodiment, the second concave portion 333*b* also has a rectangular opening and has a contact surface that extends in the depth direction from the top end of the opening toward the bottom end and which comes into contact with the inclined plane of the second protruding portion 234*b* comprised by a second liquid storage unit 20*b* according to the present embodiment. In the present embodiment, the number of second concave portions 333*b* that are formed is one.

The third ink tank 30*c* according to the present embodiment comprises a third joint pin 308*c* that is inserted into a third joint hole 203*c*, to be described later, and a third movable portion 332*c*. Further, in the third movable portion 332*c*, a third concave portion 333*c* into which a third protruding portion 234*c*, to be described later, is inserted is formed. The third concave portion 333*c* is formed at the lower portion on the front surface side of the third ink tank 30*c* and on the right side (that is, on the side in the +X-direction) in a case where the width direction (X-direction) is taken as a reference. As in the first embodiment, the third concave portion 333*c* also has a rectangular opening and has a contact surface that extends in the depth direction from the top end of the opening toward the bottom end and which comes into contact with the inclined plane of the third protruding portion 234*c* comprised by a third liquid storage unit 20*c* according to the present embodiment. In the present embodiment, the number of third concave portions 333*c* that are formed is one.

The fourth ink tank 30*d* according to the present embodiment comprises a fourth joint pin 308*d* that is inserted into a fourth joint hole 203*d*, to be described later, and a fourth movable portion 332*d*. Further, in the fourth movable portion 332*d*, a fourth concave portion 333*d* into which a fourth protruding portion 234*d*, to be described later, is inserted, and a fifth concave portion 333*e* into which a fifth protruding portion 234*e*, to be described later, is inserted are formed. The fourth concave portion 333*d* is formed at the lower portion on the front surface side of the fourth ink tank 30*d* and on the left side from the center (that is, on the side in the −X-direction) in a case where the width direction (X-direction) is taken as a reference. The fifth concave portion 333*e* is formed at the lower portion on the front surface side of the fourth ink tank 30*d* and on the right side from the center (that is, on the side in the +X-direction) in a case where the width direction (X-direction) is taken as a reference. As in the first embodiment, the fourth concave portion 333*d* also has a rectangular opening and has a contact surface that extends in the depth direction from the top end of the opening toward the bottom end and which comes into contact with the inclined plane of the fourth protruding portion 234*d* comprised by a fourth liquid storage unit 20*d* according to the present embodiment. As in the first embodiment, the fifth concave portion 333*e* also has a rectangular opening and has a contact surface that extends in the depth direction from the top end of the opening toward the bottom end and which comes into contact with the inclined plane of the fifth protruding portion 234*e* comprised by the fourth liquid storage unit 20*d* according to the present embodiment. In the present embodiment, on the front surface side of the fourth movable portion 332*d*, the two concave portions 303 (that is, the fourth concave portion 333*d* and the fifth concave portion 333*e*) are formed.

As shown in FIG. 6B, as in the first embodiment, in the present embodiment also, four of the liquid storage units 20 are provided. In the present embodiment, each of the four liquid storage units 20 is called the first liquid storage unit 20*a*, the second liquid storage unit 20*b*, the third liquid storage unit 20*c*, and the fourth liquid storage unit 20*d* in order from the left in FIG. 6B.

The first liquid storage unit 20*a* comprises the first joint hole 203*a* into which the first joint pin 308*a* is inserted, which are described above, and a first ceiling portion 232*a*. Further, on the front surface side of the first ceiling portion 232*a*, on the left side in FIG. 6B (that is, on the side in the −X-direction), the first protruding portion 234*a* that is inserted into the first concave portion 333*a* is formed, which are described above. That is, the first liquid storage unit 20*a* comprises the first protruding portion 234*a* corresponding to the formation position and shape of the first concave portion 333*a*, and the number of first concave portions 333*a*.

The second liquid storage unit 20*b* comprises the second joint hole 203*b* into which the second joint pin 308*b* is inserted, which are described above, and a second ceiling portion 232*b*. Further, on the front surface side of the second ceiling portion 232*b*, at the center in FIG. 6B in a case where the width direction (that is, X-direction) is taken as a reference, the second protruding portion 234*b* that is inserted into the second concave portion 333*b* is formed, which are described above. That is, the second liquid storage unit 20*b* comprises the second protruding portion 234*b* corresponding to the formation position and shape of the second concave portion 333*b*, and the number of second concave portions 333*b*.

The third liquid storage unit 20*c* comprises the third joint hole 203*c* into which the third joint pin 308*c* is inserted, which are described above, and a third ceiling portion 232*c*. Further, on the front surface side of the third ceiling portion 232*c*, on the right side in FIG. 6B in a case where the width direction is taken as a reference (that is, on the side in the +X-direction), the third protruding portion 234*c* that is inserted into the third concave portion 333*c* is formed, which are described above. That is, the third liquid storage unit 20*c* comprises the third protruding portion 234*c* corresponding to the formation position and shape of the third concave portion 333*c*, and the number of third concave portions 333*c*.

The fourth liquid storage unit 20*d* comprises the fourth joint hole 203*d* into which the fourth joint pin 308*d* is inserted, which are described above, and a fourth ceiling portion 232*d*. Further, on the front surface side of the fourth ceiling portion 232*d*, on the left side from the center in FIG. 6B in a case where the width direction is taken as a reference (that is, on the side in the −X-direction), the fourth protruding portion 234*d* that is inserted into the fourth concave portion 333*d* is formed, which are described above. Furthermore, on the front surface side of the fourth ceiling portion 232*d*, on the right side from the center in FIG. 6B in a case where the width direction is taken as a reference (that is, on the side in the +X-direction), the fifth protruding portion 234*e* that is inserted into the fifth concave portion 333*e* is formed, which are described above. That is, the fourth liquid storage unit 20*d* comprises the fourth protruding portion 234*d* and the fifth protruding portion 234*e* corresponding to the formation positions and shapes of the fourth concave portion 333*d* and the fifth concave portion 333*e*. Further, the fourth liquid storage unit 20*d* comprises the fourth protruding portion 234*d* and the fifth protruding portion 234*e*, and therefore, comprises the two protruding portions 204. That is, the fourth ink tank 30*d* according to the present embodiment comprises the two concave portions 303, that is, the fourth concave portion 333*d* and the fifth concave portion 333*e*, and therefore, the fourth liquid storage unit 20*d* comprises the number of protruding portions corresponding to the number of concave portions of the fourth ink tank 30*d*.

In the following, an example of a case where each liquid storage unit 20 according to the present embodiment is attached to each ink tank 30 is explained. First, a case is explained where the first liquid storage unit 20*a* is attached to the first ink tank 30*a*.

In a case where the first liquid storage unit 20*a* is attached to the first ink tank 30*a*, the first protruding portion 234*a* is inserted into the first concave portion 333*a*. As described above, the formation position of the first protruding portion 234*a* corresponds to the formation position of the first concave portion 333*a*. Further, the shape of the first protruding portion 234*a* corresponds to the shape of the first concave portion 333*a*. Furthermore, the number of protruding portions 204 comprised by the first liquid storage unit 20*a* corresponds to the number of concave portions 303 comprised by the first ink tank 30*a*. Consequently, the formation position and shape of the first protruding portion 234*a* and those of the first concave portion 333*a* correspond to each other, and the number of protruding portions 204 comprised by the first liquid storage unit 20*a* and the number of concave portions 303 comprised by the first ink tank 30*a* correspond to each other. Due to this, it is possible for a user to correctly attach the first liquid storage unit 20*a* to the first ink tank 30*a*.

Further, even in a case where a user tries to attach the second liquid storage unit 20*b* or the third liquid storage unit 20*c* to the first ink tank 30*a*, the formation position of the protruding portion 204 does not correspond to the formation position of the first concave portion 333*a*, and therefore, it is not possible to perform attachment. Furthermore, even in a case where a user tries to attach the fourth liquid storage unit 20*d* comprising the two protruding portions 204 to the first ink tank 30*a* comprising only the one concave portion 303, the number of concave portions 303 and the number of protruding portions 204 are different from each other, and therefore, it is not possible to perform attachment.

Following the above, a case where the second liquid storage unit 20*b* is attached to the second ink tank 30*b* is explained. In a case where the second liquid storage unit 20*b* is attached to the second ink tank 30*b*, the second protruding portion 234*b* is inserted into the second concave portion 333*b*. As described above, the formation position of the second protruding portion 234*b* corresponds to the formation position of the second concave portion 333*b*. Further, the shape of the second protruding portion 234*b* corresponds to the shape of the second concave portion 333*b*. Furthermore, the number of protruding portions 204 comprised by the second liquid storage unit 20*b* corresponds to the number of concave portions 303 comprised by the second ink tank 30*b*.

Consequently, the formation position and shape of the second protruding portion 234*b* and those of the second concave portion 333*b* correspond to each other, and the number of protruding portions 204 comprised by the second liquid storage unit 20*b* and the number of concave portions 303 comprised by the second ink tank 30*b* correspond to each other. Due to this, it is possible for a user to correctly attach the second liquid storage unit 20*b* to the second ink tank 30*b*.

Further, even in a case where a user tries to attach the first liquid storage unit 20*a* or the third liquid storage unit 20*c* to the second ink tank 30*b*, the formation position of the protruding portion 204 does not correspond to the formation position of the second concave portion 333*b*, and therefore, it is not possible to perform attachment. Furthermore, even in a case where a user tries to attach the fourth liquid storage unit 20*d* comprising the two protruding portions 204 to the second ink tank 30*b* comprising only the one concave portion 303, the number of concave portions 303 and the number of protruding portions 204 are different from each other, and therefore, it is not possible to perform attachment.

Following the above, a case where the third liquid storage unit 20*c* is attached to the third ink tank 30*c* is explained. In a case where the third liquid storage unit 20*c* is attached to the third ink tank 30*c*, the third protruding portion 234*c* is inserted into the third concave portion 333*c*. As described above, the formation position of the third protruding portion 234*c* corresponds to the formation position of the third concave portion 333*c*. Further, the shape of the third protruding portion 234*c* corresponds to the shape of the third concave portion 333*c*. Furthermore, the number of protruding portions 204 comprised by the third liquid storage unit 20*c* corresponds to the number of concave portions 303 comprised by the third ink tank 30*c*. Consequently, the formation position and shape of the third protruding portion 234*c* and those of the third concave portion 333*c* correspond to each other, and the number of protruding portions 204 comprised by the third liquid storage unit 20*c* and the number of concave portions 303 comprised by the third ink tank 30*c* correspond to each other. Due to this, it is possible for a user to correctly attach the third liquid storage unit 20*c* to the third ink tank 30*c*.

Further, even in a case where a user tries to attach the first liquid storage unit 20*a* or the second liquid storage unit 20*b* to the third ink tank 30*c*, the formation position of the protruding portion 204 does not correspond to the formation position of the third concave portion 333*c*, and therefore, it is not possible to perform attachment. Furthermore, even in a case where a user tries to attach the fourth liquid storage unit 20*d* comprising the two protruding portions 204 to the third ink tank 30*c* comprising only the one concave portion 303, the number of concave portions 303 and the number of protruding portions 204 are different from each other, and therefore, it is not possible to perform attachment.

Lastly, a case where the fourth liquid storage unit 20*d* is attached to the fourth ink tank 30*d* is explained. In a case where the fourth liquid storage unit 20*d* is attached to the fourth ink tank 30*d*, the fourth protruding portion 234*d* and the fifth protruding portion 234*e* are inserted into the fourth concave portion 333*d* and the fifth concave portion 333*e*, respectively. As described above, the formation positions of the fourth protruding portion 234*d* and the fifth protruding portion 234*e* correspond to the formation positions of the fourth concave portion 333*d* and the fifth concave portion 333*e*. Further, the shapes of the fourth protruding portion 234*d* and the fifth protruding portion 234*e* correspond to the shapes of the fourth concave portion 333*d* and the fifth concave portion 333*e*. Furthermore, the number of protruding portions 204 comprised by the fourth liquid storage unit 20*d* corresponds to the number of concave portions 303 comprised by the fourth ink tank 30*d*. Consequently, the formation positions and shapes of the fourth protruding portion 234*d* and the fifth protruding portion 234*e* and those of the fourth concave portion 333*d* and the fifth concave portion 333*e* correspond to each other. Then, the number of protruding portions 204 comprised by the fourth liquid storage unit 20*d* and the number of concave portions 303 comprised by the fourth ink tank 30*d* correspond to each other. Due to this, it is possible for a user to correctly attach the fourth liquid storage unit 20*d* to the fourth ink tank 30*d*.

Further, even in a case where a user tries to attach the first liquid storage unit 20*a*, the second liquid storage unit 20*b*, or the third liquid storage unit 20*c* to the fourth ink tank 30*d*, the formation position of the protruding portion 204 does not correspond to the formation position of the fourth concave portion 333*d*, and therefore, it is not possible to perform attachment. Furthermore, even in a case where a user tries to attach the first liquid storage unit 20*a*, the second liquid storage unit 20*b*, or the third liquid storage unit 20*c*, each comprising only the one protruding portion 204, to the fourth ink tank 30*d* comprising the two concave portions 303, it is not possible to perform attachment.

Consequently, with the liquid storage unit 20 and the ink tank 30 according to the present embodiment, it is possible to suppress erroneous attachment of the liquid storage unit 20 by a user. Consequently, with the liquid storage unit 20 and the ink tank 30 according to the present embodiment, it is possible for a user to correctly attach the liquid storage unit 20 to the ink tank 30. Further, the liquid storage unit 20 is attached correctly to the ink tank 30, and therefore, it is also possible to suppress the mixture of ink within the ejection head 10 (see FIG. 1) and the ink tank 30.

Fourth Embodiment

In the present embodiment, an object is to make the shape of the protruding portion 204 simpler. In the first embodiment, the inclined plane for pushing up the movable portion 302 is provided on the protruding portion 204, but the present embodiment is different from the first embodiment in that no inclined plane is formed on the protruding portion 204 according to the present embodiment.

In the following, the present embodiment is explained with reference to FIG. 7A to FIG. 7C. In the following explanation, the same symbol is attached to the same configuration as that of the first embodiment and at the same time, explanation thereof is omitted and different points are explained mainly.

Figures 7A, 7B, 7C:
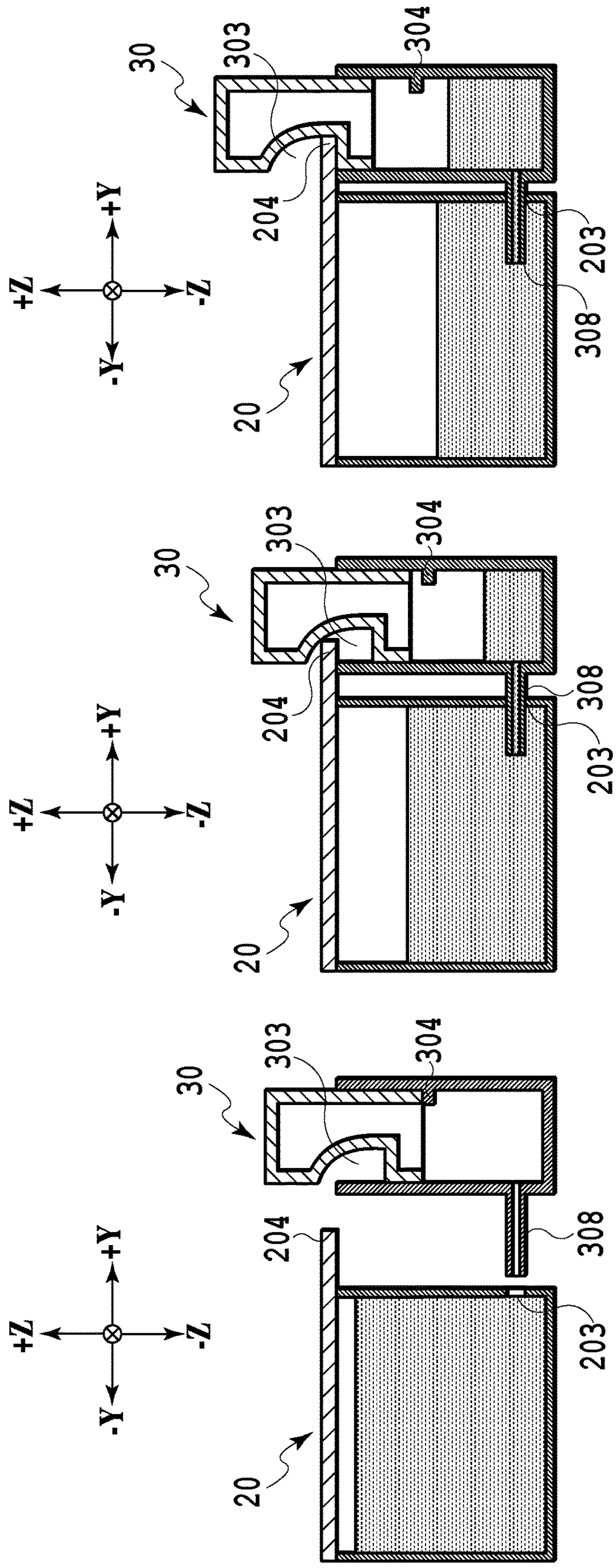
FIG. 7A to FIG. 7C are each a schematic diagram showing the liquid storage unit and the ink tank.

FIG. 7A to FIG. 7C are each a schematic diagram showing the liquid storage unit 20 and the ink tank 30 according to the present embodiment. FIG. 7A is a diagram corresponding to step 1 in the first embodiment. FIG. 7B is a diagram corresponding to step 4 in the first embodiment. FIG. 7C is a diagram corresponding to step 5 in the first embodiment. As shown in FIG. 7A, no inclined plane for pushing up the movable portion 302 is formed on the protruding portion 204 as described above. The shape of the protruding portion 204 according to the present embodiment is the shape of a rod in a side view. The shape of the protruding portion 204 may be the shape of a simple rod or flat board. Further, the shape of the concave portion 303 according to the present embodiment may be the shape of an arc in a cross-sectional diagram. That is, the contact surface that is formed in the concave portion 303 and with which the tip portion of the protruding portion 204 comes into contact may be rounded. Even in a case where the shape of the protruding portion 204 is made the shape of a rod and the contact surface of the concave portion 303 is rounded, as long as it is possible to convert the force in the horizontal direction in which the protruding portion 204 is inserted into the concave portion 303 to a force that pushes up the movable portion 302 in the upward direction (+Z-direction), the pressure within the ink tank 30 becomes negative. That is, even in a case where the shape of the protruding portion 204 is made the shape of a rod and the contact surface of the concave portion 303 is rounded, as long as it is possible to push up the movable portion 302 in the upward direction, it is possible to cause the suction force of ink to occur.

With the liquid storage unit 20 according to the present embodiment, it is possible to make the shape of the protruding portion 204 simpler. Further, the protruding portion 204 is a simple shape, and therefore, it is also made possible to manufacture the liquid storage unit 20 at a low cost.

Fifth Embodiment

In the present embodiment, an object is to provide the ink tank 30 to which the liquid storage unit 20 can be attached easily. In the first embodiment, the liquid storage unit 20 comprises the protruding portion 204 and the ink tank 30 comprises the concave portion 303. In contrast to that, the present embodiment is different from the first embodiment in that the liquid storage unit 20 comprises the concave portion 303 and the ink tank 30 comprises the protruding portion 204. In the following, the present embodiment is explained with reference to FIG. 8A to FIG. 8C. In the following explanation, the same symbol is attached to the same configuration as that of the first embodiment and at the same time, explanation thereof is omitted and different points are explained mainly.

Figure 8A:
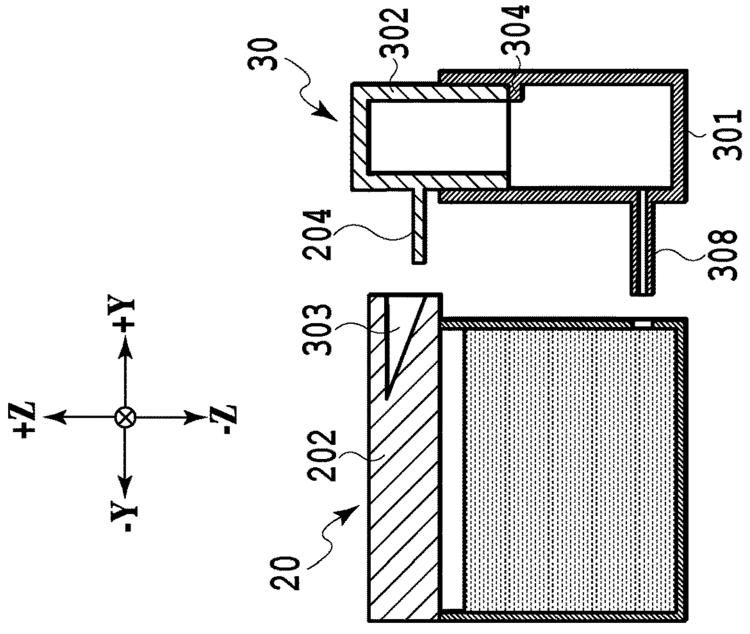
FIG. 8A to FIG. 8C are each a schematic diagram showing the liquid storage unit and the ink tank.
Figure 8B:
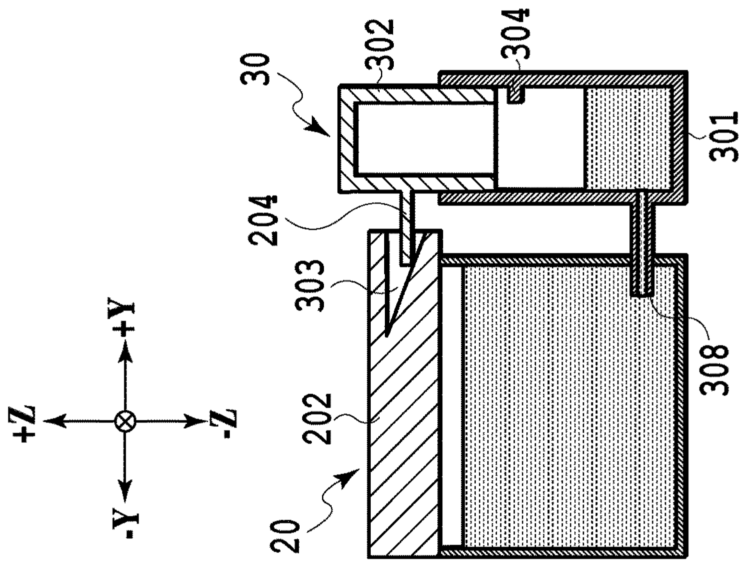
Figure 8C:
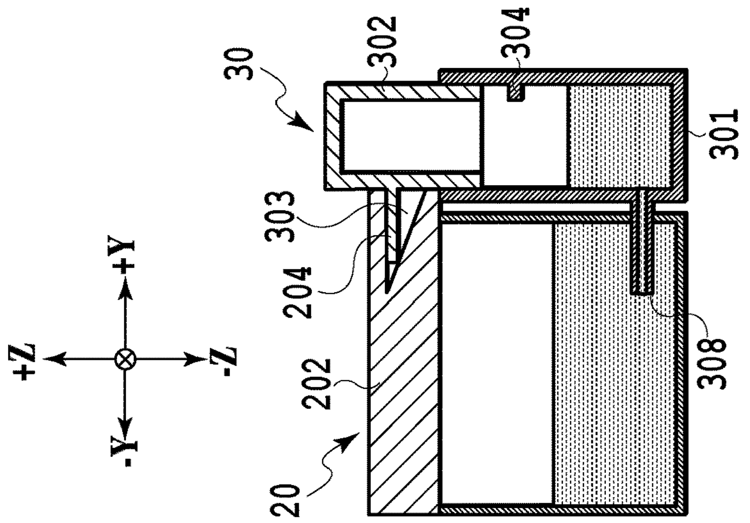

FIG. 8A to FIG. 8C are each a schematic diagram showing the liquid storage unit 20 and the ink tank 30 according to the present embodiment. FIG. 8A is a diagram corresponding to step 1 in the first embodiment. FIG. 8B is a diagram corresponding to step 4 in the first embodiment. FIG. 8C is a diagram corresponding to step 5 in the first embodiment. As shown in FIG. 8A, in the ceiling portion 202 of the liquid storage unit 20 according to the present embodiment, the concave portion 303 that is formed in the surface facing the ink tank 30 and which is concave in the direction in which the protruding portion 204 formed on the movable portion 302 extends is formed. On the other hand, on the movable portion 302 of the ink tank 30, the protruding portion 204 is formed.

As shown in FIG. 8B, at step 4, in a case where the protruding portion 204 comprised by the ink tank 30 is inserted into the concave portion 303 comprised by the liquid storage unit 20, the movable portion 302 moves from the first position to the second position that is higher than the first position as in the first embodiment. That is, the movable portion 302 moves from the first position to the second position that is higher than the first position as the protruding portion 204 comprised by the movable portion 302 is inserted into the concave portion 303 formed in the liquid storage unit 20 while being in contact with the concave portion 303. In the present embodiment also, by the movable portion 302 moving from the first position to the second position, the pressure within the ink tank 30 becomes negative and the force that pulls ink from the liquid storage unit 20 into the ink tank 30 occurs, and therefore, it is possible to suppress bubble clogging. In the present embodiment also, it is preferable for the joint pin 308 to be inserted into the joint hole 203 prior to the insertion of the protruding portion 204 into the concave portion 303.

As shown in FIG. 8C, at step 5, in a case where the protruding portion 204 comprised by the ink tank 30 is inserted completely into the concave portion 303 comprised by the liquid storage unit 20, the liquid storage unit 20 is fixed as in the first embodiment. As explained above, the ink tank 30 according to the present embodiment comprises the two convex portions, that is, the joint pin 308 and the protruding portion 204. On the other hand, the liquid storage unit 20 according to the present embodiment comprises the two holes, that is, the joint hole 203 and the concave portion 303.

Consequently, in the present embodiment, in a case where the liquid storage unit 20 is attached to ink tank 30, it is sufficient to perform attachment so that the two convex portions comprised by the ink tank 30 are inserted into the two holes comprised by the liquid storage unit 20. That is, it is no longer necessary to insert the convex portion comprised by the liquid storage unit 20 into the hole comprised by the ink tank 30 and insert the convex portion comprised by the ink tank 30 into the hole comprised by the liquid storage unit 20, respectively, which is necessary in the first embodiment. As explained above, with the ink tank 30 according to the present embodiment, it is only necessary to insert the two convex portions comprised by the ink tank 30 into the two holes comprised by the liquid storage unit 20, and therefore, it is possible to perform the attachment of the liquid storage unit 20 easily.

OTHER EMBODIMENTS

As above, for the explanation of the technique according to the present disclosure, the requisite minimum configurations are shown schematically and explained, but it may also be possible to add another configuration as needed. For example, it may also be possible to add an element that records information on the liquid storage unit 20, a mark or the like for improving the visual recognizability of the stored ink, a biasing unit (for example, spring and the like) involved in the attachment and removal of the liquid storage unit 20, a coupling unit (for example, protrusion and the like), and the like.

Further, as shown also in FIG. 1 and FIG. 2 in the first embodiment, in a case where the one liquid ejection apparatus 1 comprises a plurality of the liquid storage units 20, it is not necessary to make the same the size of each liquid storage unit 20. For example, in this case, as shown in FIG. 2B, the liquid storage unit 20 whose width is different from that of the other liquid storage unit 20 is used.

Further, in the first embodiment, the example is shown in which the ink tank 30 is attached to the outside of the main body of the liquid ejection apparatus 1, but the ink tank 30 may be attached to the inside of the ejection head 10. Furthermore, the ink tank 30 may be attached to any portion inside the main body different from the ejection head 10 or may be attached to the outside of the main body of the ejection head 10.

Further, the movable portion 302 according to the present embodiment may comprise an ink leakage suppression unit configured to suppress leakage of the ink within the reservoir portion 301 from the gap between the reservoir portion 301 and the movable portion 302. As an example of the ink leakage suppression unit, for example, it may also be possible to fill in the gap between the reservoir portion 301 and the movable portion 302 by winding rubber membrane, cellophane thin membrane, material that expands in a case where water is contained, or the like around the outside of the circumferential wall of the movable portion 302.

Further, it may also be possible to fill in the gap between the reservoir portion 301 and the movable portion 302 by constructing part or the entire of the reservoir portion 301 and the movable portion 302 by using an elastic member and hermetically sealing the gap by using the elastic force of the elastic member. Then, it may also be possible to fill in the gap between the reservoir portion 301 and the movable portion 302 by manufacturing part or the entire of the reservoir portion 301 and the movable portion 302 by using a material that expands in a case water is contained and expanding the material.

Further, the ink tank 30 according to the first embodiment comprises the restriction portion 304 and restricts the movement of the movable portion 302 in the direction of gravity, but it may also be possible to comprise a second restriction portion that restricts the movement of the movable portion 302 in the opposite direction of gravity.

In the first embodiment, the example is shown in which the fixing portion 306 comprises the board member 306*a* and the biasing unit 306*b*, but the example in which the fixing portion 306 fixes the liquid storage unit 20 is not limited to this example. For example, mention is made of an example in which a claw portion is formed on the bottom surface portion of the liquid storage unit 20 and engaged with the groove comprised by the foundation portion 307.

As another example of the fixing portion 306, it may also be possible to fix the liquid storage unit 20 by joining the liquid storage unit 20 and the ink tank 30 by a magnet. By the configuration such as this, it is possible to fix the liquid storage unit 20 on the foundation portion 307 of the ink tank 30. That is, as long as it is possible to suppress the liquid storage unit 20 from retracting, which is caused by the weight of the movable portion 302, any configuration of the fixing portion 306 may be accepted.

In the second embodiment, the example is shown in which the slit 309 is formed on the back surface side of the movable portion 302, but the formation position of the slit 309 is not limited to this position. For example it may also be possible to form the slit 309 on the side surface of the movable portion 302 or in the corner portion of the movable portion 302.

Any formation position of the slit 309 may be accepted as long as the slit 309 is located on the circumferential wall of the movable portion 302 and does not communicated with the concave portion 303 and it is possible to cause the inside of the reservoir portion 301 and the outside of the reservoir portion 301 to communicate with the atmosphere.

Further, in the second embodiment, the example is shown in which the opening 205 is formed in the upper portion on the back surface side of the liquid storage unit 20, but the formation position of the opening 205 is not limited to this example. As another example, mention is made of an example in which the opening 205 is formed in the upper portion on the side surface of the liquid storage unit 20. Further, it may also be possible to form the opening 205 in the ceiling portion 202 on the premise that the opening 205 is closed by using the ink leakage suppression unit in a case where the liquid storage unit 20 is not used (that is, in a case where the liquid storage unit 20 is not attached to the ink tank 30). Any formation position of the opening 205 may be accepted as long as it is possible to cause the inside of the liquid storage portion 201 and the outside of the liquid storage portion 201 to communicate with the atmosphere without leaking the ink within the liquid storage unit 20.

As above, in the present specification, explanation is given by taking the five embodiments, but these are not exclusive to one another and it may also be possible to combine these embodiments. For example, it may also be possible to apply the opening 205 of the liquid storage unit 20 and the slit 309 of the ink tank 30 according to the second embodiment to the liquid storage unit 20 and the ink tank 30 according to the third embodiment or the fourth embodiment.

Further, it may also be possible to apply the shape of the protruding portion 204 comprised by the liquid storage unit 20 according to the fourth embodiment to the protruding portion 204 according to the third embodiment. Of course, at this time, it may also be possible to use the shape of the concave portion 303 of the ink tank 30 according to the third embodiment as the shape of the concave portion 303 according to the fourth embodiment. Further, as long as the technical idea of the present disclosure is obeyed, it is also possible to add another configuration that is not referred to here.

According to the technique of the present disclosure, it is possible to suppress bubble clogging at the time of attaching a liquid storage unit to an ink tank.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-146464, filed Sep. 8, 2021 which are hereby incorporated by reference wherein in its entirety.

REFERENCE SIGNS LIST

20 liquid storage unit
30 ink tank
201 liquid storage portion
202 ceiling portion
203 joint hole
301 reservoir portion
302 movable portion
303 concave portion
304 restriction portion

What is claimed is:

1. An ink tank comprising:
a joint pin to be inserted into a joint hole located at a liquid storage unit;
a reservoir portion configured to internally reserve ink supplied via the joint hole and the joint pin; and
a movable portion capable of moving inside the reservoir portion,
wherein as a protruding portion located at the liquid storage unit is inserted into a concave portion formed in the movable portion while being in contact therewith, the movable portion moves from a first position to a second position higher than the first position.

2. The ink tank according to the claim 1, wherein
inside a circumferential wall of the reservoir portion, a restriction portion for restricting the movable portion from moving in a direction opposite to the direction from the first position toward the second position.

3. The ink tank according to the claim 1, wherein
a contact surface being contact with the protruding portion in the concave portion is formed so that its depth increases in the direction opposite to the direction from the first position toward the second position.

4. The ink tank according to the claim 1, wherein
the length of the joint pin is greater than the length of the protruding portion.

5. The ink tank according to the claim 1, comprising:
a foundation portion for mounting the liquid storage unit,
wherein the foundation portion includes a fixing portion configured to restrict movement of the liquid storage unit after the joint pin is inserted into the joint hole and fixes the liquid storage unit.

6. The ink tank according to the claim 1, wherein
a slit is formed in the movable portion, configured to communicate with the atmosphere in a case where the movable portion is located at the highest position in a range in which the movable portion can move, and configured not to communicate with the atmosphere in a case where the movable portion is not located at the highest position in the range in which the movable portion can move.

7. A liquid ejection apparatus comprising:
a liquid storage unit; and
an ink tank to be able to attach the liquid storage unit,
wherein the liquid storage unit includes:
a liquid storage portion for storing ink being supplied to an ink tank having a movable portion configured to moves from a first position to a second position higher than the first position and a joint pin to be supplied with ink;

a joint hole located at a surface facing the joint pin for supplying ink to the ink tank; and a protruding portion located at a surface facing the ink tank and protruding toward a concave portion formed in the movable portion, wherein the ink tank includes:

a joint pin to be inserted into a joint hole located at the liquid storage unit;

a reservoir portion configured to internally reserve ink supplied via the joint pin and the joint hole; and a movable portion capable of moving inside the reservoir portion, wherein as the protruding portion comprised by the liquid storage unit is inserted into the concave portion formed in the movable portion while being in contact therewith, the movable portion moves from a first position to a second position higher than the first position.

8. The liquid ejection apparatus according to the claim 7, wherein in the movable portion comprised by the ink tank, the concave portion comprising a formation position, shape, and number corresponding to those of the protruding portion is formed.

* * * * *